United States Patent [19]

Niki

[11] Patent Number: 5,535,287
[45] Date of Patent: Jul. 9, 1996

[54] METHOD OF AND APPARATUS FOR SEPARATING IMAGE

[75] Inventor: Touru Niki, Yokohama, Japan

[73] Assignee: Canon Kabushiki Kaisha, Tokyo, Japan

[21] Appl. No.: 203,483

[22] Filed: Feb. 28, 1994

Related U.S. Application Data

[63] Continuation of Ser. No. 753,985, Sep. 3, 1991, abandoned.

[30] Foreign Application Priority Data

Sep. 3, 1990 [JP] Japan ..................................... 2-230600

[51] Int. Cl.$^6$ ..................................................... G06K 9/34
[52] U.S. Cl. .......................................... 382/178; 282/179
[58] Field of Search ..................................... 382/9, 13, 22, 382/50, 173, 177, 178, 179, 199, 187, 270

[56] References Cited

U.S. PATENT DOCUMENTS

| | | | |
|---|---|---|---|
| 4,206,442 | 6/1980 | Miyazaki et al. | 382/9 |
| 4,769,849 | 9/1988 | Alsing | 382/22 |
| 5,046,114 | 9/1991 | Zobel | 382/9 |
| 5,138,668 | 8/1992 | Abe | 382/13 |

FOREIGN PATENT DOCUMENTS 2218839  11/1989  United Kingdom .

OTHER PUBLICATIONS

Schridhar, et al., "Recognition of Isolated and Simply Connected Handwritten Numerals", *Pattern Recognition*, vol. 19, No. 1, pp. 1–12 (1986).

Primary Examiner—Joseph Mancuso
Attorney, Agent, or Firm—Fitzpatrick, Cella, Harper & Scinto

[57] ABSTRACT

A method and apparatus for correctly cutting an unidentified read composite character image into separate and discrete character images suitable for use in recognizing characters in which the images have been wrongly joined to each other to form a composite image when read from an original. For the purpose of correctly determining the position where the composite image is to be cut into separate character images, the apparatus has a configuration tracing device for detecting coordinate information concerning the configuration of an image of interest in input image information from an original. A distance computing device computes, on the basis of the coordinate information obtained by the configuration tracing device, the distances between the ends of the configuration traced by the configuration tracing device as measured in the direction perpendicular to the train of characters, for successive points along a line parallel to the train of characters. A separation position determining device determines, on the basis of the distance information obtained by the distance computing device, a position where the image is to be cut into separate images.

20 Claims, 9 Drawing Sheets

METHOD OF AND APPARATUS FOR SEPARATING IMAGE

This application is a continuation of application Ser. No. 07/753,985 filed Sep. 3, 1991, now abandoned.

BACKGROUND OF THE INVENTION

1. Field of the Invention

The present invention relates to a method of and an apparatus for separating adjoining image regions, suitable for use in recognizing discrete characters from optically input image information in the form of a pattern composed of images of characters adjoining or connected to each other.

2. Description of the Related Art

In recent years, apparatuses have been proposed which are capable of optically and directly inputting character information by using optical means such as image scanners. Such apparatuses are very useful as they enable entry of character information from hand-written or printed or typed characters. In use of these apparatuses, however, recognition of discrete characters is often hampered by the fact that the optically read images of two or more successive characters on the original undesirably form a continuous image pattern composed of the character images adjoining and connected each other, due to various reasons such as a practical limit in the resolution of the image scanner, stains on the original document, and so forth.

Methods have been proposed to separate such adjoining images or patterns into discrete character images to enable correct character recognition, among the most popular method for separating adjoining images is one which utilizes a histogram of a projection of the image along the direction of the train (the direction of the line of writing) of the characters.

This known character separation method will be described with reference to FIGS. 7 and 8. It is assumed here that characters "a" and "c" on an original were optically read and that a composite image composed of images of the characters "a" and "c" adjoining each other has been obtained as shown in FIG. 7. When the height-to-length ratio of an envelope rectangle 201 of this composite image is equal to or below a certain value, i.e., when this composite image is horizontally very much elongated, the image is determined as being a composite image composed of images of successive characters adjoining each other and, hence, a demand arises for separation of this composite image into images of the discrete characters "a" and "c". To cope with this demand, a region 202 in which the separation is to be done is determined on the basis of the information concerning the envelope rectangle 201, and black pixels forming this composite image are projected on the X-axis of a coordinate so that a histogram 203 indicative of the frequencies of appearance of black pixels along the train of characters is obtained as shown in FIG. 8. Then, an X coordinate $X_c$, which is within the above-mentioned region 202 and which has a histogram value d(x) not greater than a predetermined threshold $d_0$, is determined as shown in FIG. 8. When there are a plurality of such X coordinates Xc, the mean value of these coordinates is determined as the coordinate Xc.

The composite image is then "cut" into separate character images at the portion thereof corresponding to the X coordinate Xc. Thus, when the height-to-length ratio is equal to or below a predetermined value, the read composite image is determined as being a combination of images of successive characters, and the region 202 within which the composite character is to be cut is set on the basis of the configuration of the composite image. Then, the composite image is cut into discrete character images at a portion thereof where the frequency of occurrence of black pixels is lowest within the set region, i.e., at the portion where the degree of bond between a plurality of groups of pixels is weakest.

This known method, however, suffers from the disadvantage that the separation of character images is often hampered by influence of noise, due to the fact that the position where the composite image is "cut" is determined on the basis of the black pixel histogram.

For instance, a histogram as shown in FIG. 10 is obtained when a stain on the original sheet is optically read to form an image 204 shown in FIG. 9 or when characters on the line which is immediately preceding the line which is being read extend far enough down on the scanned manuscript, etc., to have happened to be read concurrently.

The image 204 of the stain increases the number of black pixels on the X-coordinate Xc to a value greater than the threshold value $d_0$. In other words, there is no X-coordinate where the projection of the black pixels is equal to or below the threshold value $d_0$ (see FIG. 10). As a consequence, the composite image composed of images of characters adjoining each other cannot be correctly cut into discrete character images, making it impossible to recognize these characters.

SUMMARY OF THE INVENTION

Accordingly, an object of the present invention is to provide a method of and an apparatus for separating image regions which enable composite image regions to be cut into separate or discrete image regions corresponding to, for example, separate or discrete characters, thereby overcoming the above-described problems of the prior art.

To these ends, according to one aspect of the present invention, there is provided an image separation apparatus, comprising: configuration tracing means for detecting coordinate information concerning the configuration of an image of interest in an image information input from an original; distance computing means for computing, on the basis of the coordinate information obtained by the configuration tracing means, the distances between the ends of the image of interest traced by the configuration tracing means as measured in the direction perpendicular to the train of characters, for successive points along a line parallel to the train of characters; and separation position determining means for determining, on the basis of the distance information obtained by the distance computing means, a position where the image is to be cut into separate images.

According to another aspect of the invention, there is provided an image separation method, comprising the steps of: detecting coordinate information concerning the configuration of an image of interest in image information input from an original; computing the distances between the ends of the configuration traced by the configuration tracing means as measured in the direction perpendicular to the train of characters, for successive points along a line parallel to the train of characters, and determining, on the basis of the distance information, a position where the image is to be cut into separate images.

Distribution of the distances between the nearest point and the farthest point on the image configuration as viewed in the direction perpendicular to the direction of the train of the characters is computed along a line parallel to the character train, on the basis of the coordinate information obtained by the configuration tracing means, and the position where the distance is smallest is determined as the position where the image is to be cut into separate images of characters.

DESCRIPTION OF THE PREFERRED EMBODIMENTS

The invention will be described in more detail with reference to the drawings.

Figure 1:
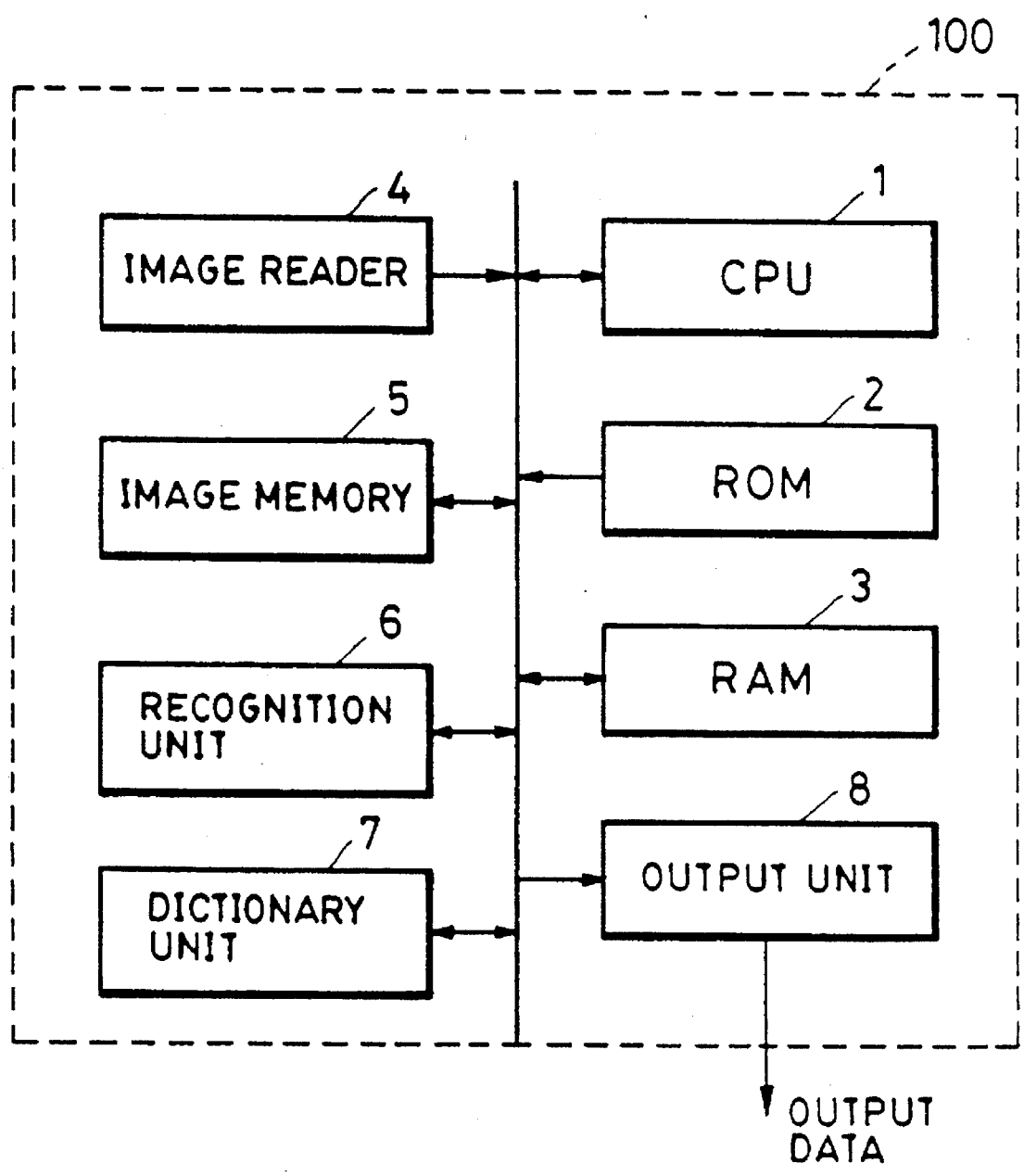
FIG. 1 is a block diagram of a character recognition apparatus constructed in accordance with the present invention.
Figure 2:
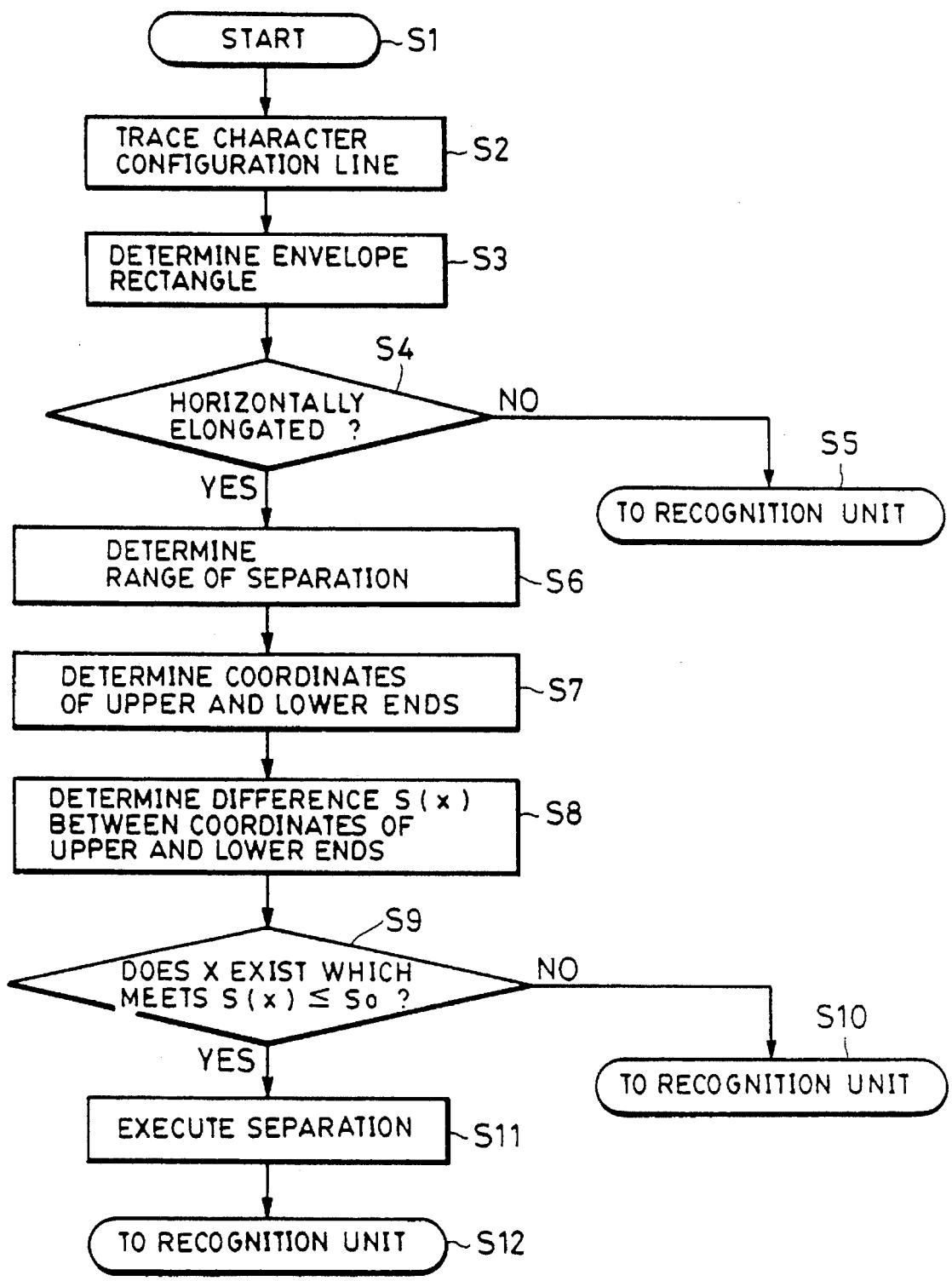
FIG. 2 is a flow chart showing character separation process performed in a first embodiment of the present invention.
Figure 5:
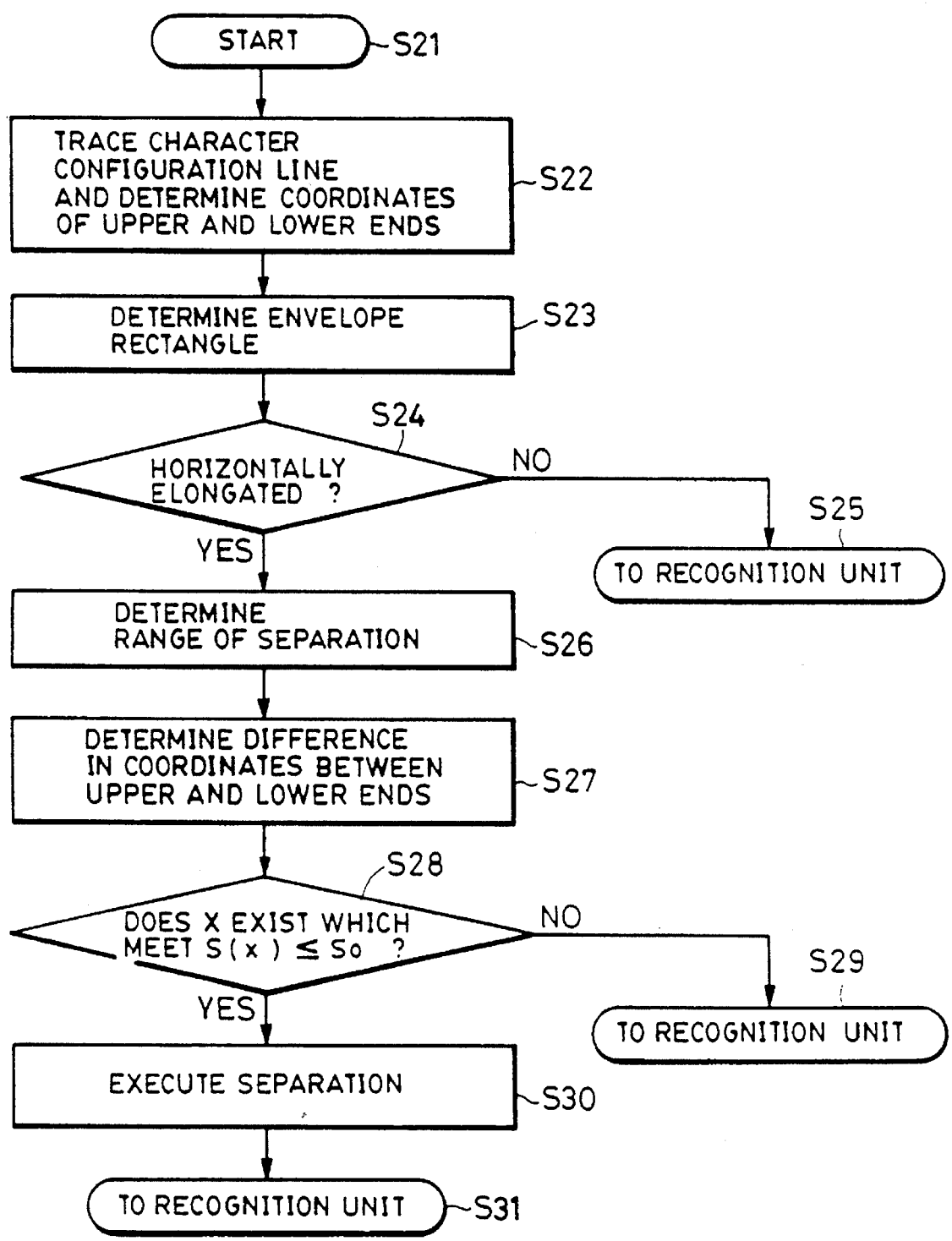
FIG. 5 is a flow chart showing a character separation process employed in a second embodiment of the present invention.
Figure 6:
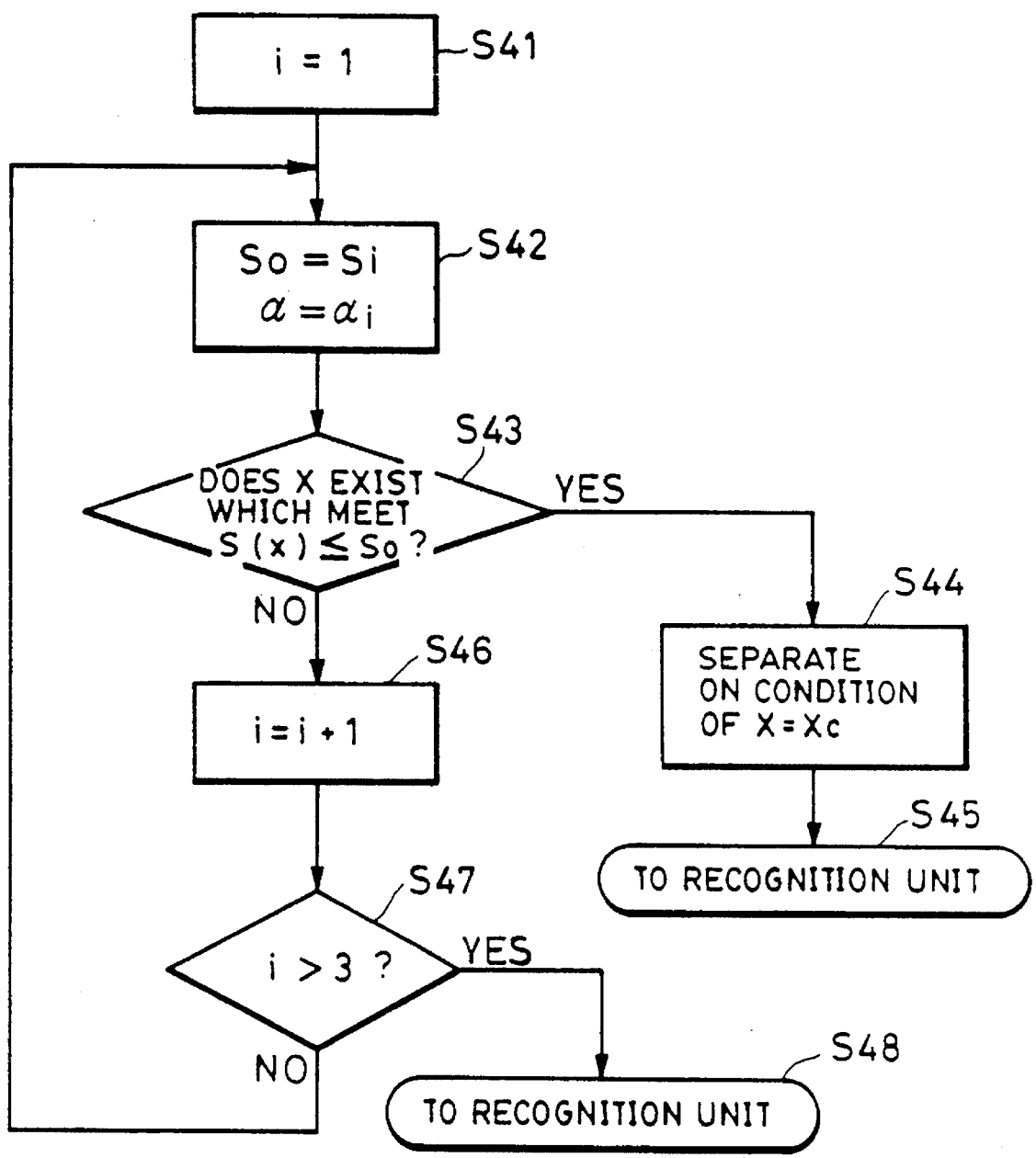
FIG. 6 is a flow chart showing a character separation process employed in a third embodiment of the present invention.
Figure 7:
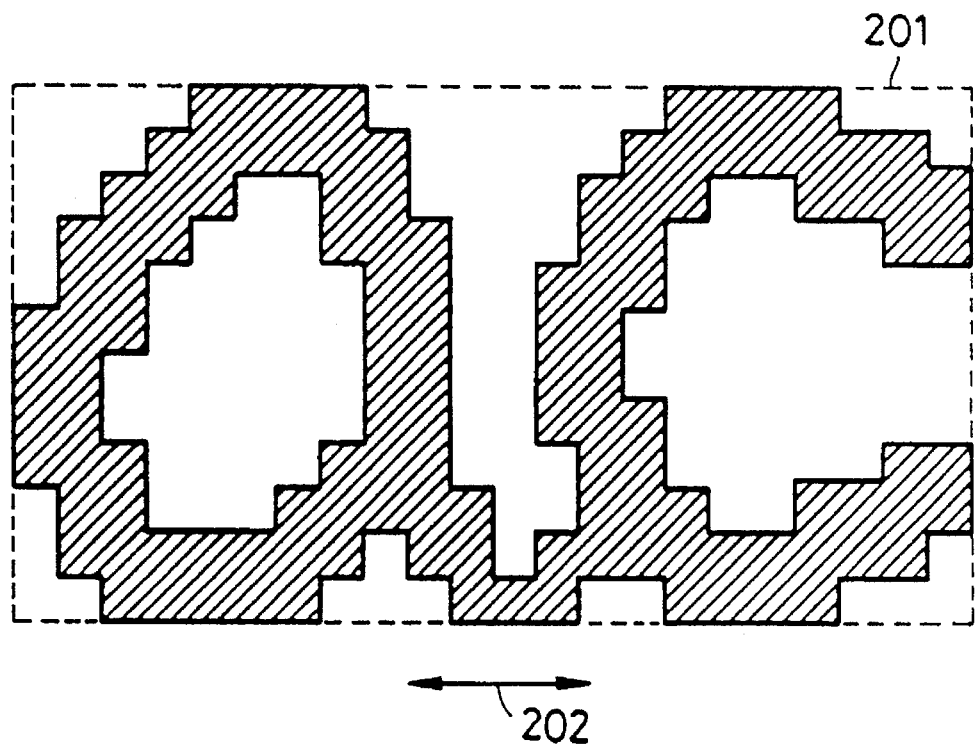
FIGS. 7 to 10 are illustrations of the outline of a conventional character separation process.
Figure 8:
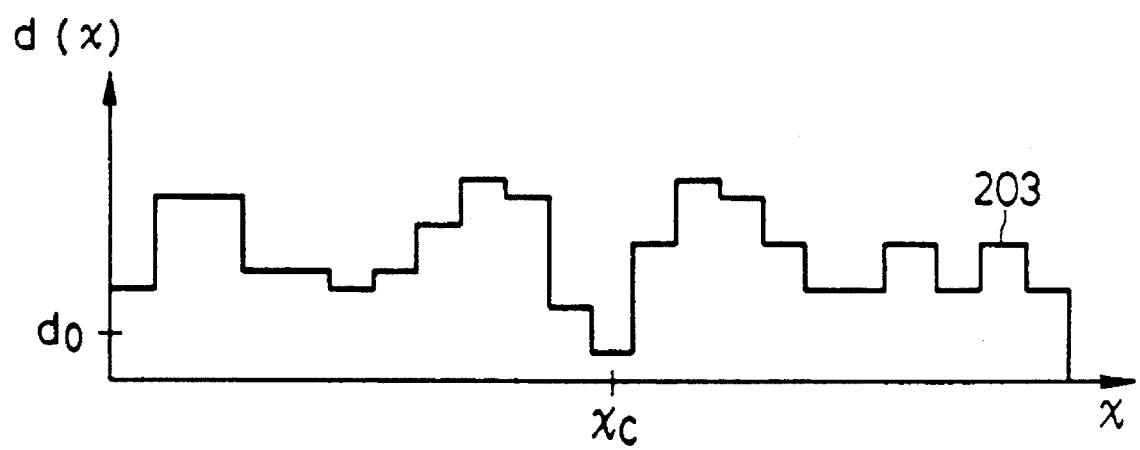
Figure 9:
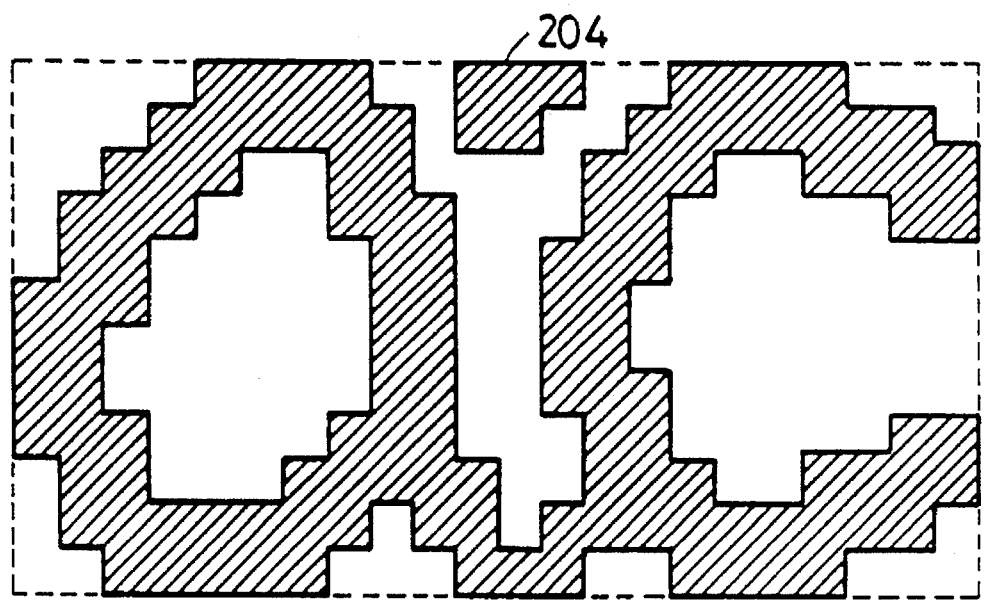
Figure 10:
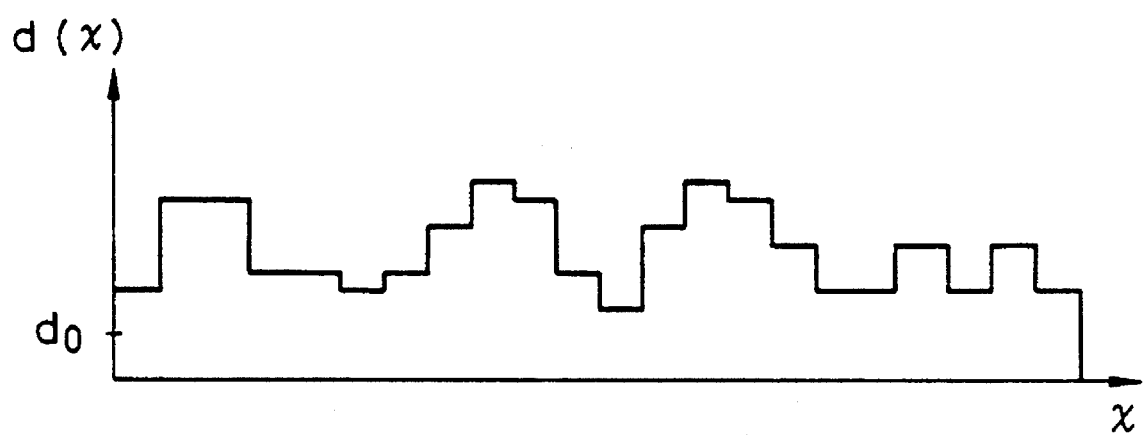

Referring to FIG. 1, a character recognition apparatus embodying the present invention has a main unit 100 which includes: a CPU 1 for controlling the operation of the whole apparatus; a ROM 2 storing programs of operations which are to be performed by the CPU 1 and which are shown in the flowcharts of FIGS. 2, 5 and 6; a RAM 3 which serves as a work area for the CPU 1; an image reader 4 which reads the image of an original; and an image memory 5 which develops the read image. The apparatus also has a recognition unit 6 for recognizing a pattern of an image of a character which has been cut from the image data developed in the image memory 5, a dictionary unit 7 to which the recognition unit 6 refers during recognition processing, and an output unit through which the result of the recognition is output.

The flow of a process performed by the character recognition apparatus will be described with reference to FIG. 2. An original image has been read by the image reader 4 and developed as a binary image in the image memory 5.

Figure 3:
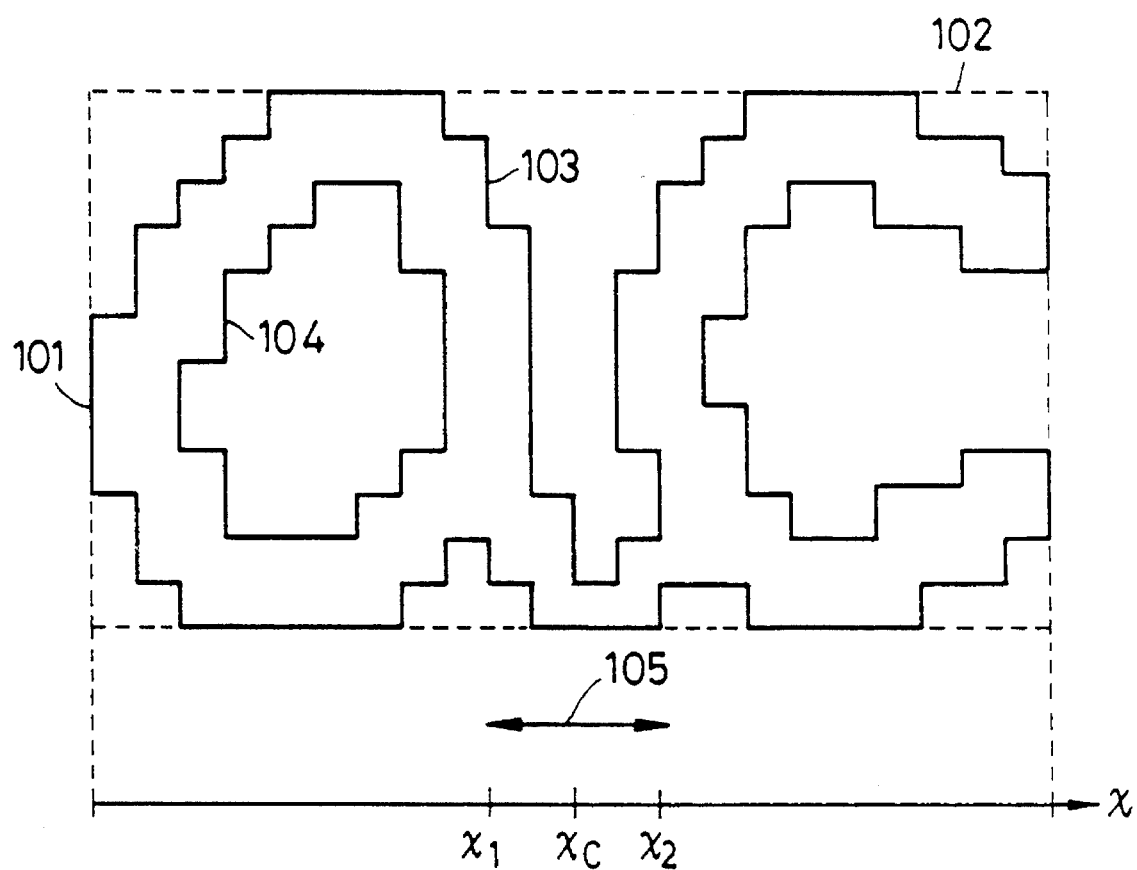
FIG. 3 is an illustration of a composite image in which images of two characters adjoin each other.

In Step S1, the developed image is received from the image memory 5. In Step S2, configuration of the character is traced by a known method which is typically a method consisting of tracing of pixels in one-by-one fashion. FIG. 3 shows the configuration determined by tracing. The tracing is commenced at a point 101 and, after determining the configuration 103, terminates at the point 101. In this embodiment, it is not necessary to extract the inner contour 104 of the image. It will be seen that FIG. 4(A) shows the outer configuration of the characters alone.

In Step S3, a rectangle 102 enveloping the image is determined on the basis of the configuration information obtained in Step S2. Step S4 determines the height-to-length ratio R of the envelope rectangle 102 and determines whether the ratio R is equal to or smaller than a predetermined threshold value $R_0$, i.e., whether the image is horizontally elongated to such an extent as to suggest that the image is a composite image composed of two or more character images adjoining and connected to each other. Thus, $R > R_0$ suggests that the image represents a single character. When this condition is met, the process proceeds to Step S5 which delivers the image data to the recognition unit 6 without conducting character separation. Conversely, $R \leq R_0$ suggests that the read image is a composite image composed of images of a plurality of characters adjoining each other. In this case, the process proceeds to Step S6 in which an operation is executed to determine the region within which the separation, i.e., cutting of the image into discrete character images, is to be conducted. FIG. 3 illustrates the method for determining the region in which the separation is to be done. In this Figure, axis X of the abscissa corresponds to the direction of the train of the characters. The X-coordinate value 0 coincides with the left end of the envelope rectangle. The X-coordinates $X_1$ and $X_2$ of the region 105 where the separation is to be conducted are determined so to meet the following conditions:

$X_c = W/2$ $X_1 = X_c - \alpha$ $X_2 = X_c + \alpha$ $\alpha = \gamma \cdot h$ where W and h respectively represent the width (or length) and the height of the envelope rectangle, while $\gamma$ is a predetermined constant.

Figure 4A:
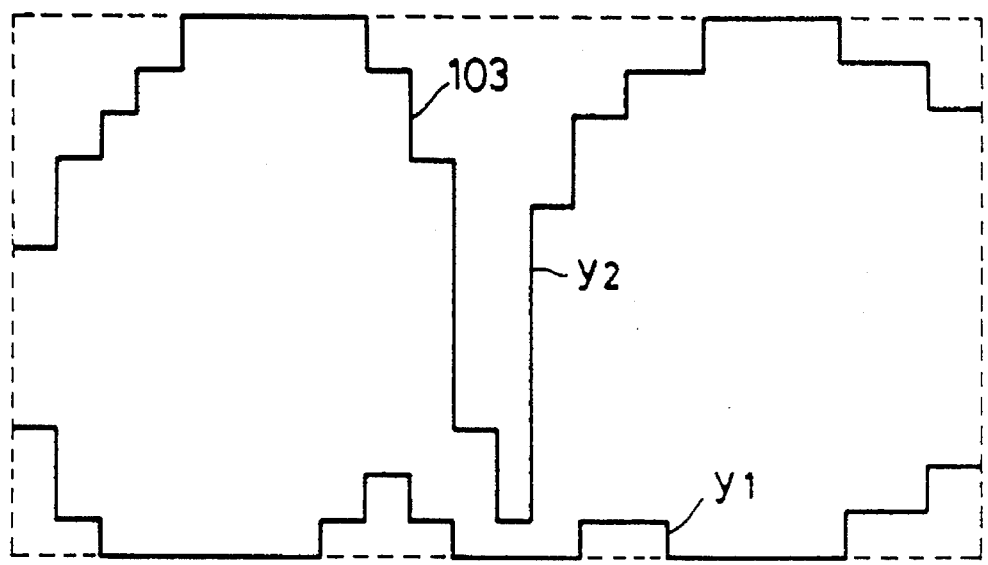
FIG. 4(A) is an illustration of a configuration of the composite image defined by coordinates of upper and lower ends of the composite image.

As will be seen from FIG. 4(A), the configuration 103 of the image is determined by two configuration lines: namely, an upper configuration line y2 and a lower configuration line y1 which are spaced from each other in the direction perpendicular to the character train. In Step S7, these configuration lines y2 and y1 (termed upper and lower ends in FIG. 3) are determined in terms of the X-coordinates, as two functions, y2(x) and y1(x).

In Step S8, the difference S(x) between the upper and lower configuration lines is determined as follows along the X-axis:

$$S(x) = y2(x) - y1(x)$$

Figure 4B:
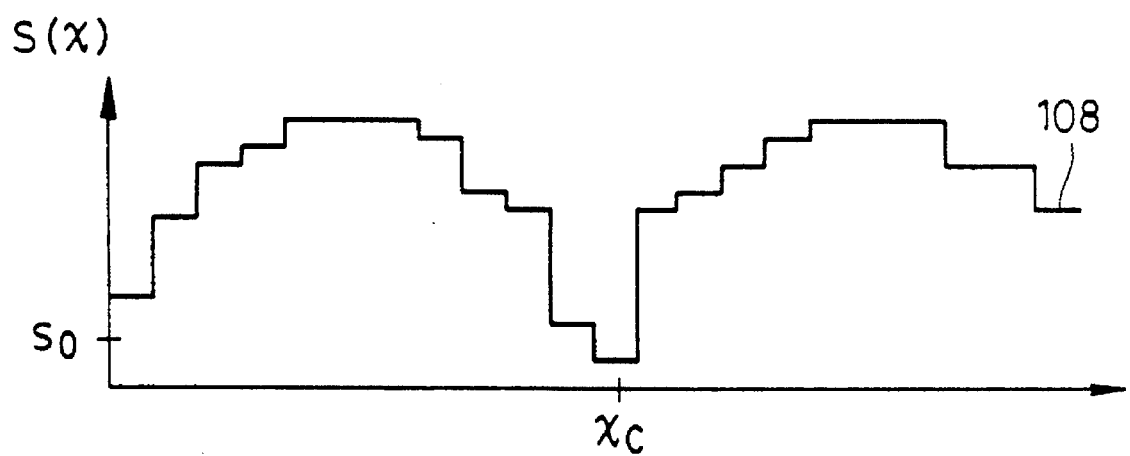
FIG. 4(B) is an illustration of a distribution of the difference between the upper and lower end coordinates.

In Step S9, the value S(x) of the difference at each X-coordinate falling within the range 105 of separation (see FIG. 3) is compared with a predetermined threshold $S_0$. The X-coordinate corresponding to any difference value S(x) which meets the condition of $S(x) < S_0$ is determined as the X-coordinate $X_c$ where the cutting or separation is to be performed. When a plurality of X-coordinate values meet the above-mentioned condition, the mean value of these X-coordinates is used as the X-coordinate $X_c$ at which the image is to be cut. FIG. 4(B) shows the histogram of the difference value S(x).

The cutting or separation is not possible when there is no X-coordinate which meets the condition of $S(x) < S_0$. In such a case, the process proceeds to Step S 10 which delivers the whole image in question to the recognition unit 6, or a suitable sub-routine is commenced to treat this image as an image which cannot be identified.

When the X-coordinate $X_c$ at which the image is to be cut is determined, the process proceeds to Step S11 in which all the pixels on the X-coordinate $X_c$ are turned into the white state so as to cut the image into an image of a first character on the left of the X-coordinate $X_c$ and an image of a second character which is on the right of the X-coordinate $X_c$. These discrete characters, obtained through the separation process as explained, are delivered one by one to the recognition unit 6 in Step S12.

A second embodiment will be described with reference to a flow chart shown in FIG. 5. In this embodiment, the coordinates of the upper and lower ends, i.e., the upper and lower configuration lines, of the image are determined simultaneously in the course of determination of the configuration line.

A sufficiently small value is set as the upper end coordinate y2(x) for all characters. Similarly, sufficiently large characters are set as the lower end coordinate y1(x) for all characters. The X coordinate x varies from 0 to 1, 1 to 2 and finally to W which corresponds to the width or length of the rectangle, i.e., the X-coordinate of the right end of the rectangle.

In Step S22, the value y of the x,y coordinates of each pixel on the traced profile line of the character is compared with the above-mentioned coordinates y2(x) and y1(x) which have been stored. If the condition y>y2(x) is met, the coordinate value y2(x) is updated by being replaced by the value y. Similarly, the coordinate value y1(x) is updated by being replaced by y when the condition y<y1(x) is met. Consequently, all the values y1(x) and y2(x) for each X-coordinate x have been obtained when the trace of the configuration line is finished.

This process will be explained in more detail with reference to FIG. 11.

Figure 11:
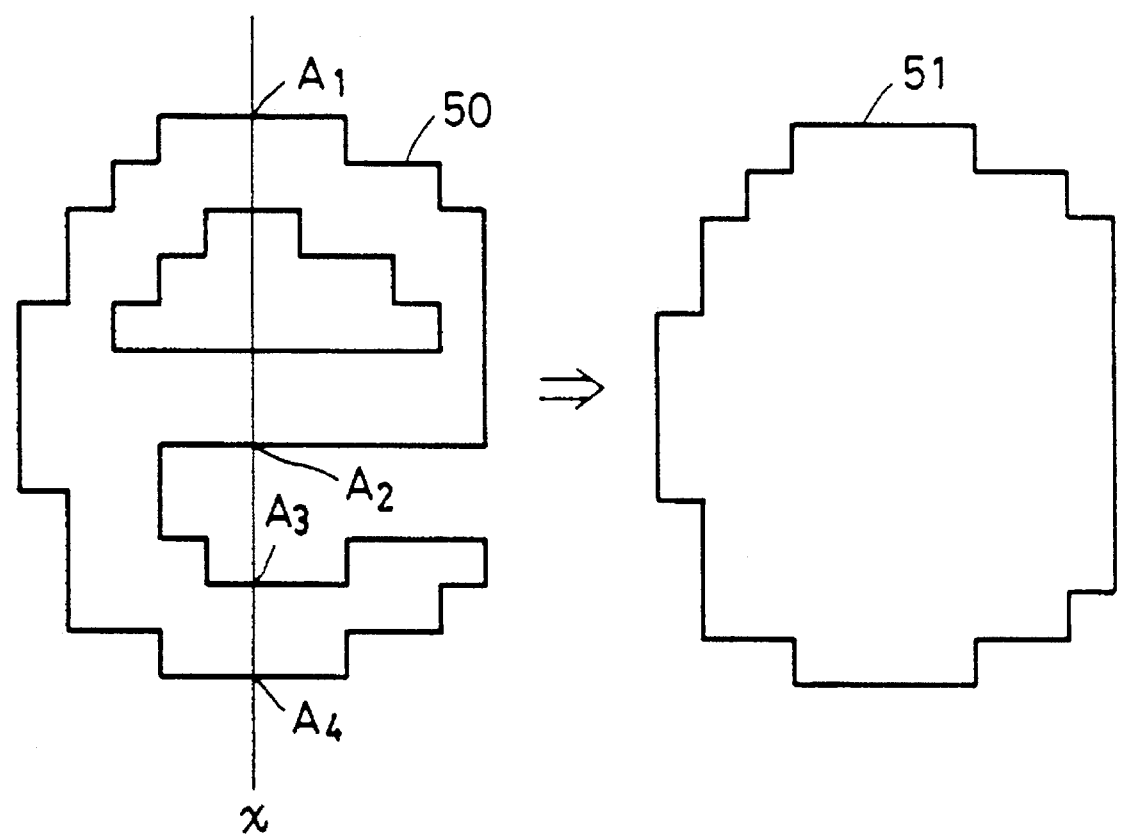
FIG. 11 is an illustration of the principle of operation of the second embodiment of the invention.

During tracing of the configuration 50 of a character image, more than 2 points, e.g., four points $A_1$ to $A_4$ as illustrated in FIG. 11, appear for a given X-coordinate. In this embodiment, the coordinates of the points $A_1$ and $A_4$ are regarded as being the coordinates of the upper and lower ends, whereby a pattern 51 as shown in FIG. 11 is obtained. To this end, as explained before, the value y of the coordinates x, y of each of the pixels successively detected on the configuration line during the tracing is compared with any upper end coordinate y2(x) which has been previously obtained on the same X-coordinate x and, when the condition y>y2(x) is met, the value of the upper end coordinate y2(x) is replaced by the value y. Consequently, the value y of the coordinates of the point $A_1$ is adopted as the upper end coordinate y2(x) for the above-mentioned X-coordinate x. The lower end coordinate y1 (x) also is determined by the same principle as described above.

In the second embodiment, steps S23 onwards are the same as those in the first embodiment, so that description of these steps is omitted.

In a third embodiment of the invention, the position where the composite image is to be cut is determined by varying the threshold value $S_0$ of the difference value S(x).

The third embodiment employs a process which is shown by a flow chart in FIG. 6. More specifically, this flowchart shows only steps corresponding to Steps S9 to S12 in the first embodiment shown in FIG. 2. Other portions of the process are not described because they are materially identical to those of the first embodiment. In the first embodiment described above, a simple sign indicative of impossibility of character separation is given when there is no X-coordinate which meets the condition $S(x) \leq S_0$. In contrast, in the third embodiment, the separating operation is conducted repeatedly after varying the threshold value $S_0$ and the width $X_c \pm \alpha$ of the region where the image is to be cut.

In Step S 41, the control variable i is set to 1. In Step S 42, the threshold value $S_0$ and the threshold factor α are respectively set to $S_i$ and $\alpha_i$. In the illustrated embodiment, the control variable i is changed as i=1, 2 and 3 and a plurality of combinations of thresholds $(S_1, \alpha_1)$, $(S_2, \alpha_2)$ and $(S_3, \alpha_3)$ are determined in advance of the processing, under the conditions $S_1 < S_2 < S_3$ and $\alpha_1 > \alpha_2 > \alpha_3$.

In Step S43, a search is made for any X-coordinate x which falls within the range between $X_1$ and $X_2$ determined as below and which satisfies the condition of $S(x) \leq S_i$. Such X-coordinate x, if any, is used as the X-coordinate $X_c$ where the image is to be cut. The process then proceeds to Step S44 in which the image is cut into two portions which are each images of two discrete characters. The separated character images are then subjected to recognition operation, executed in Step S45. If there is no X-coordinate meeting the above-mentioned conditions, the process proceeds to Step S46 in which the variable i is incremented by one for each of the thresholds $S_0$ and α. In Step S47, the value of the variable i is examined. When the value is greater than 3 (i>3), the process proceeds to Step S48, in which the image in question is delivered to the recognition unit 6 without being cut. However, when the value of the variable i is not greater than 3 (i≤3), the process returns to Step S42 to repeat the described operation.

In the third embodiment, therefore, a search is made first over a wider region for a bond between two character images and, when no such bond is found, the search is conducted again over a narrower region. When such a bond is detected in the narrowed region of the search, character separation is conducted at the position of such a bond even when the bond is rather strong.

In the first to third embodiments described hereinbefore, characters in an original text read by an image reader 4 are recognized and the results of the recognition are output to a suitable external device. Such a way of use of the recognition result is only illustrative. That is, the results of recognition may be sent to a display device for displaying the recognized characters or to a device which can process the words composed of the recognized characters.

It will also be clear that the invention can be applied as well to the case where the characters are arrayed in vertical trains, although recognition of characters forming horizontal trains has been specifically described. The apparatus of the invention, when applied to vertical trains of characters, is designed to determine the position of separation on the basis of distributions of the greatest and smallest coordinate values X along an axis Y which is parallel to the direction of the vertical trains of the characters. Again, it will be understood that the invention is not limited to use with black characters on a white ground, but is applicable to any digitized input character data distinguishable in color or gradation from the background.

As will be understood from the foregoing description, according to the present invention, the determination of the position where an unidentified image is to be cut is conducted on the basis of the distribution of the distances between the upper and lower ends of the configuration line, in contrast to the conventional technique which simply relies upon the frequency of appearance of black pixels. It is, therefore, possible to exclude any black pixel or pixels which are not connected to the continuous traced configuration line and which are generated as a result of, for example, presence of a stain on the original or erroneous reading of an adjacent line. Thus, the present invention greatly enhances the credibility and reliability of separation of character images, by virtue of elimination of noises caused by presence of a stain on the original or erroneous reading of an adjacent line and, hence, remarkably improves the ability to recognize and identify read characters.

What is claimed is:

1. An image separation apparatus, comprising:
    configuration tracing means for tracing coordinate information concerning a configuration of an image of input image data;
    distance computing means for computing, on the basis of the coordinate information traced by said configuration tracing means, distance information relating to distances between an upper y coordinate end and a lower y coordinate end of the traced configuration as measured in a direction perpendicular to a train of characters represented by the input image data, for successive points along a line parallel to the train of characters; and
    separation position determining means for determining, on the basis of the distance information obtained by said distance computing means, a position where the image data is to be cut into separate images,
    wherein said separation position determining means determines, as the position where the image of interest is to be cut, a position where a distance between the ends of the configuration as computed by said distance computing means is equal to or smaller than a predetermined threshold value, and wherein, when no distance information computed by said distance computing means is equal to or below the threshold value, said separation position determining means conducts again its position determining operation after varying the threshold value.

2. An image separation apparatus according to claim 1, further comprising means for determining, on the basis of a height-to-length ratio of an envelope rectangle of the image data, whether the image data is to be cut into separate images, said distance computing means being activated when said determining means has determined that the image data is to be cut into separate images.

3. An image separation apparatus according to claim 1, further comprising region computing means for computing, on the basis of a height-to-length ratio of an envelope rectangle of the image data, a region in which the cutting of the image data into separate images is to be conducted, said separation position determining means determining the position within the region computed by said region computing means.

4. An image separation apparatus according to claim 1, wherein said input image data contains at least two connected images.

5. An image separation apparatus according to claim 1, wherein the distance of said configuration is computed in accordance with the coordinate information of the traced configuration.

6. An image separation apparatus according to claim 1, further comprising pixel editing means for changing a pixel at the position determined by said separation position determining means into a white pixel.

7. An image separation apparatus according to claim 1, wherein said configuration tracing means performs one trace back to a starting point of the traced configuration of the input image data.

8. An image separation apparatus according to claim 1, further comprising control means for controlling the configuration tracing means so that the input image data is traced by said configuration tracing means.

9. An image separation method, comprising the steps of:
    tracing coordinate information concerning a configuration of input image data;
    computing distances between an upper y coordinate end and a lower y coordinate end of the traced configuration as measured in a direction perpendicular to a train of characters, for successive points along a line parallel to said train of characters represented by the image data; and
    determining, on the basis of the distances computed in said computing step, a position where the image of interest is to be cut into separate images,
    wherein, when no distance computed in said step of computing distances is equal to or below a threshold value, said step for determining the position where the image data is to be cut is conducted again after the threshold value is varied.

10. An image separation method according to claim 9, further comprising the step of deciding, on the basis of a height-to-length ratio of an envelope rectangle of the input image data, whether the input image data is to be cut into separate images, and, in the case it has been decided that the input image data is to be cut into separate images, said computing step computes the distances.

11. An image separation method according to claim 9, further comprising the step of computing, on the basis of a height-to-length ratio of an envelope rectangle of the image data, a region in which the cutting of the image data into separate images is to be conducted, wherein said step of determining the position where the image is to be cut is conducted to determine the position within the region computed in said region computing step.

12. An image separation method according to claim 9, wherein the position where the image data is to be cut is determined as a position where the computed distance is equal to or smaller than a predetermined threshold value.

13. An image separation method according to claim 9, wherein said input image data contains at least two connected images.

14. An image separation method according to claim 9, wherein the distance of said configuration is computed in accordance with the coordinate information of the traced configuration.

15. An image separation method according to claim 9, further comprising the step of changing a pixel at the position determined in said determining step into a white pixel.

16. An image separation method according to claim 9, wherein in said tracing step, the configuration is traced back to the starting point of the configuration of the input image data.

17. An image separation method according to claim 9, further comprising the step of controlling the tracing of the input image data such that the input image data is traced in said tracing step.

18. An image separation apparatus, comprising:
    configuration tracing means for tracing an exterior contour of input image data;
    distance computing means for computing distances between an upper and lower extremity of the traced exterior contour; and
    separation position determining means for determining, on the basis of the distances computed by said distance computing means, a position where the image data is to be cut into separate images,
    wherein said separation position determining means determines, as the position where the image data is to be cut, a position where a distance between an upper and lower extremity of the traced exterior contour as computed by said distance computing means is equal to or smaller than a predetermined threshold value, and wherein, when no distance computed by said distance computing means is equal to or below the threshold value, said separation position determining means conducts again its position determining operation after varying the threshold value.

19. An image separation apparatus according to claim 18, further comprising means for determining, on the basis of a height-to-length ratio of an envelope rectangle of the image data, whether the image data is to be cut into separate images, said distance computing means being activated when said determining means has determined that the image data is to be cut into separate images.

20. An image separation apparatus according to claim 18, further comprising region computing means for computing, on the basis of a height-to-length ratio of an envelope rectangle of the image data, a region in which the cutting of the image data into separate images is to be conducted, said separation position determining means determining the position within the region computed by said region computing means.

* * * * *

UNITED STATES PATENT AND TRADEMARK OFFICE
CERTIFICATE OF CORRECTION

PATENT NO. : 5,535,287
DATED      : July 9, 1996
INVENTOR   : Touru Niki

It is certified that error appears in the above-identified patent and that said Letters Patent is hereby corrected as shown below:

ON THE COVER item [54] and col. 1, line 3, "IMAGE" should read --IMAGE REGIONS--.

Under [56] References Cited, "Schridhar" should read --Shridhar--.

COLUMN 1

Line 2, "IMAGE" should read --IMAGE REGIONS--; and
Line 25, "connected" should read --connected to--.

COLUMN 5

Line 15, "characters" should read --values--.

Signed and Sealed this

Eleventh Day of March, 1997

Attest:

BRUCE LEHMAN

*Attesting Officer*  *Commissioner of Patents and Trademarks*